May 6, 1924.
J. F. SCHNEIDER
TRANSMISSION NEUTRAL LATCH
Filed Jan. 17, 1923
1,493,287
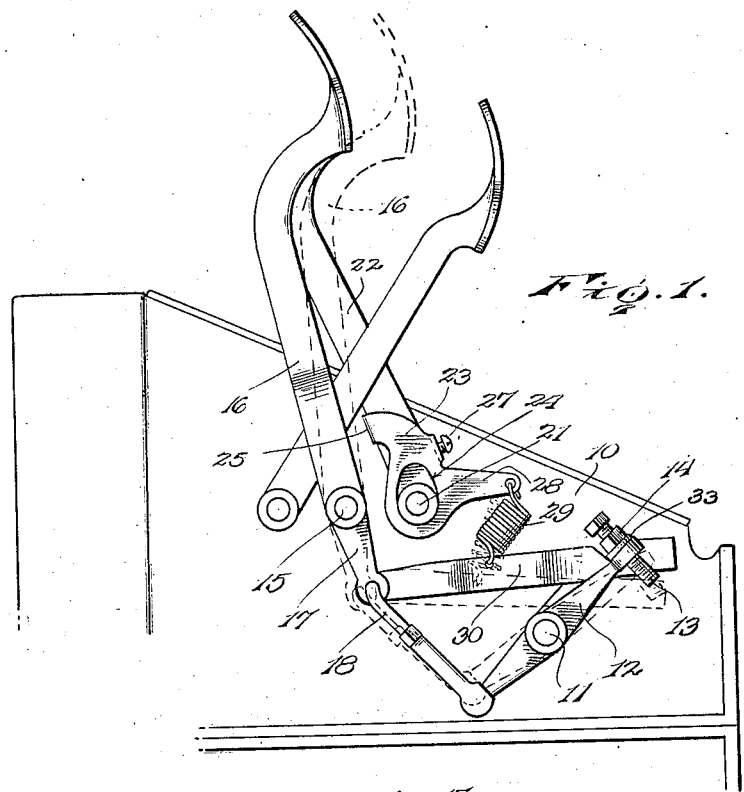
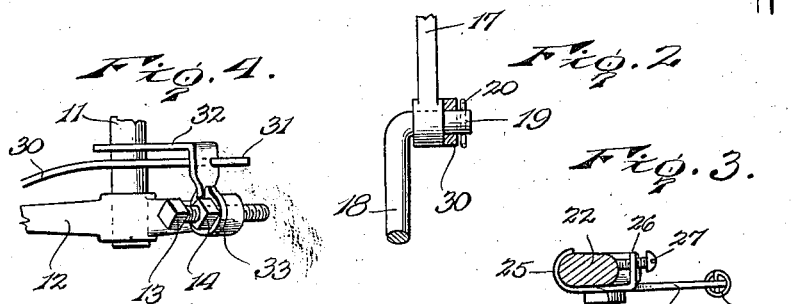
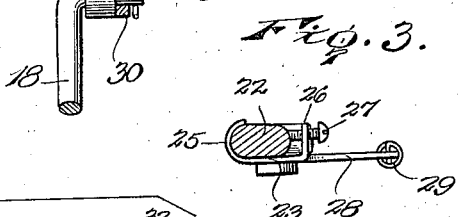
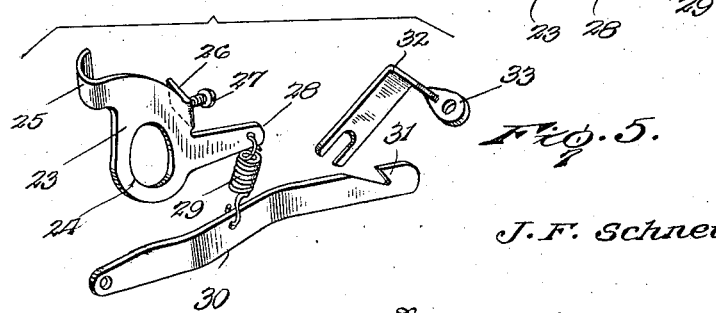
Inventor
J. F. Schneider.
By Lacey & Lacey, Attorneys Patented May 6, 1924.

1,493,287

UNITED STATES PATENT OFFICE.

JOHN F. SCHNEIDER, OF WESTON, ILLINOIS.

TRANSMISSION NEUTRAL LATCH.

Application filed January 17, 1923. Serial No. 613,178.

*To all whom it may concern:*

Be it known that I, JOHN F. SCHNEIDER, a citizen of the United States, residing at Weston, in the county of McLean and State of Illinois, have invented certain new and useful Improvements in Transmission Neutral Latches, of which the following is a specification.

This invention relates to an improved neutral latch for Ford motor vehicles and seeks to provide a device whereby the vehicle transmission may be locked in neutral position, without the necessity for swinging the emergency brake lever as is now required.

The invention has as a further object to provide a latch which may be easily and quickly engaged and which may be released with equal facility.

And the invention has as a still further object to provide a latch which may be readily applied and which will require no structural change in the vehicle to accommodate the device.

Other and incidental objects will appear hereinafter.

In the drawings:

Figure 1 is a side elevation showing my improved device in connection with the foot pedals and associated parts of a Ford engine transmission, Figure 2 is a detail view showing the mounting of the latch bar of the device, Figure 3 is a detail sectional view showing the mounting of the brake pedal plate of the device, Figure 4 is a detail plan view showing the mounting of the latch plate of the device, and Figure 5 is a perspective view showing the parts of the device in detail.

Referring now more particularly to the drawings, I have, in order to clearly bring out the mounting and operation of my improved latch, shown the device in connection with the foot pedals and associated parts of a Ford engine transmission. The transmission casing is indicated at 10 and projecting from the casing at one side thereof is the high speed clutch pedal shaft 11 upon which is mounted a lever 12. Threaded through the rear end of this lever is a screw 13 disposed to cooperate with a controller shaft lever, not shown, and arranged upon the screw is a lock nut 14. Projecting from the casing in advance of the shaft 11 is a low speed clutch shaft 15 carrying a low speed pedal 16 from the hub of which projects a downwardly directed arm 17 and pivotally connecting said arm with the forward end of the lever 12 is a coupling including a rod 18 having, as shown in Figure 2, a laterally directed terminal 19 extending through the lower end of said arm and secured by a cotter pin 20. Projecting from the transmission casing in the rear of the shaft 15 is a brake pedal shaft 21 carrying a brake pedal 22. The parts thus far described are all of conventional construction and need not be further set forth in detail. However, it should be noted that when the pedal 16 is rocked to a medial position for rendering the low speed clutch of the transmission inactive, the shaft 11 is rotated in a counter-clockwise direction for disengaging the high speed clutch of the transmission, the rear end of the lever 12 being swung upwardly to the approximate position shown in Figure 1. To maintain the transmission thus inactive, it is now necessary to swing the emergency brake lever of the vehicle rearwardly for rocking the controller shaft mentioned and swinging the speed lever carried by said shaft upwardly to engage the lower end of the screw 13, the emergency brake lever being latched to support the rear end of the lever 12 elevated. The present invention provides a device which will accomplish the same result without swinging of the emergency brake lever.

Coming now more particularly to the subject of the present improvements, I employ a brake pedal plate 23 shaped to fit against the base of the brake pedal 22 at its outer side and provided with an aperture 24 to receive the hub of said pedal. Formed on the plate at its upper end is a forwardly directed bowed keeper 25 fitting, as shown in Figure 3, around the forward edge of the pedal and extending from the rear edge of the plate below the plane of said keeper is a lug 26 through which is threaded a clamp screw 27 adjustable to impinge the rear edge of the pedal toward the inner side thereof, binding the plate upon the pedal. Projecting from the rear edge of the plate below the lug 26 is a rearwardly directed arm 28 and connected at its upper end to said arm is a spring 29. Pivoted at its forward end upon the terminal 19 of the rod 18 is a latch bar 30 which, as shown in Figure 2, is secured by the cotter pin 20. The bar is offset inwardly toward the transmission casing 10 and, as will now be observed, the lower end of the spring is engaged with the bar medially thereof to form a yieldable connection between said bar and the arm 28 of the brake pedal plate. At its rear end portion, the bar extends above the shaft 11 between the lever 12 and the transmission casing and is notched at its upper edge to define a terminal hook or tooth 31. Engaged at one end with the shaft 11 is an angle shaped latch plate 32 slotted to snugly accommodate the shaft and provided at its opposite end with an eye 33 to lie flat upon the rear end of the lever 12 freely receiving the screw 13 therethrough clamped by the nut 14. Thus, the plate will be rigidly sustained to extend between the shaft 11 and the free end of said lever.

Referring now particularly to Figure 1, it will be seen that when the clutch pedal 16 is, as shown in dotted lines, permitted to swing rearwardly for rendering the high speed clutch of the transmission active, the lever 12 will be rocked in a clockwise direction so that the latch plate 32 will bear against the upper edge of the latch bar 30 at the rear of the notch in said bar and swing the bar downwardly, as shown in dotted lines, stretching the spring 29. A similar result will follow when the clutch pedal is rocked forwardly to render the low speed clutch of the transmission active. However, when the lever is brought to neutral position, as shown in full lines, the rear end of the lever 12 will be swung upwardly so that the latch plate 32 will clear the upper edge of the latch bar 30 disposed over the notch at the rear end of the bar. Accordingly, by then slightly rocking the brake pedal 22 forwardly, the arm 28 of the plate 23 will be swung for lifting the bar to engage the tooth 31 thereof with the latch plate when, as will be seen, the latch bar will cooperate between the brake pedal and the lever 12 for holding the lever in neutral position rendering the transmission inactive. The forward movement of the brake pedal required to lift the latch bar will, as previously indicated, only be slight and not sufficient to engage the brake clutch so that, as will be seen, the clutch pedal 16 may be easily and quickly locked in neutral position without the necessity for actuating the usual emergency brake lever of the vehicle.

To release the latch bar, the clutch pedal 16 is slightly rocked forwardly, which will result in rocking the rear end of the lever upwardly and coincidently shifting the latch bar rearwardly. The latch bar will accordingly be freed, when said bar will drop down to be sustained at its free end portion by the spring 29 so that the pedal may then be further rocked forwardly or allowed to rock rearwardly in the usual manner. I accordingly provide a particularly simple and efficient device for the purpose set forth and, as will now be seen, a device which may be applied without difficulty.

Having thus described the invention, what is claimed as new is:

1. A neutral latch for motor vehicle transmissions including a latch bar for pivotal connection with a low speed clutch pedal, a latch plate for connection with a high speed clutch lever, a brake pedal plate apertured to accommodate the hub of a brake pedal and provided with a keeper to engage about the forward edge of such pedal, a clamp screw carried by the latter plate and adjustable to engage the brake pedal securing the brake pedal plate thereon, the brake pedal plate being provided with an arm, and a spring forming a connection between said arm and the latch bar whereby the brake pedal may be rocked for shifting the latch bar into engagement with said latch plate locking the clutch pedal and said lever in neutral position.

2. A neutral latch for motor vehicle transmissions including a latch bar for pivotal connection with a low speed clutch pedal, a latch plate for connection with a high speed clutch lever, a brake pedal plate provided with a keeper to engage about one edge of a brake pedal, a clamp screw adjustable upon said plate toward the keeper to engage the brake pedal at its opposite edge securing the brake pedal plate thereon, and a spring forming a connection between the brake pedal plate and the latch bar whereby the brake pedal may be rocked for shifting the latch bar into engagement with said latch plate locking the clutch pedal and said lever in neutral position.

3. A neutral latch for motor vehicle transmissions including a latch bar for pivotal connection with a low speed clutch pedal, an angle shaped latch plate notched at one end to straddle a high-speed clutch shaft and provided at its opposite end with an eye to receive the set screw of a lever upon said shaft connecting the plate with said lever, and means connected with the latch bar adapted for connection with a brake pedal whereby said brake pedal may be rocked for shifting the bar into engagement with said plate locking the clutch pedal and said lever in neutral position.

4. A neutral latch for motor vehicle transmissions including a latch bar for pivotal connection with a low speed clutch pedal, a latch plate for connection at one end with a high speed clutch lever and provided at its opposite end with means to engage a high speed clutch shaft carrying said lever, and means connected with the latch bar adapted for connection with a brake pedal whereby said brake pedal may be rocked for shifting the bar into engagement with said plate locking the clutch pedal and said lever in neutral position.

In testimony whereof I affix my signature.

JOHN F. SCHNEIDER. [L. s.]